(12) United States Patent
Kondapalli et al.

(10) Patent No.: US 8,417,934 B2
(45) Date of Patent: Apr. 9, 2013

(54) METHOD AND APPARATUS FOR INTEGRATING PRECISE TIME PROTOCOL AND MEDIA ACCESS CONTROL SECURITY IN NETWORK ELEMENTS

(75) Inventors: Raghu Kondapalli, San Jose, CA (US); Guy T. Hutchison, Santa Clara, CA (US)

(73) Assignee: Marvell World Trade Ltd., St. Michael (BB)

( * ) Notice: Subject to any disclaimer, the term of this patent is extended or adjusted under 35 U.S.C. 154(b) by 768 days.

(21) Appl. No.: 12/545,522

(22) Filed: Aug. 21, 2009

(65) Prior Publication Data

US 2010/0049964 A1 Feb. 25, 2010

Related U.S. Application Data

(60) Provisional application No. 61/091,241, filed on Aug. 22, 2008.

(51) Int. Cl.
*H04L 29/06* (2006.01)

(52) U.S. Cl. ........ 713/150; 713/189; 709/225; 709/226; 709/229; 709/236; 380/36; 380/277

(58) Field of Classification Search .................. 713/150, 713/201; 709/236, 225, 226, 229; 380/36, 380/277
See application file for complete search history.

(56) References Cited

U.S. PATENT DOCUMENTS

| 5,235,644 A * | 8/1993 | Gupta et al. ................... 713/161 |
| 6,959,327 B1 * | 10/2005 | Vogl et al. ..................... 709/219 |
| 2008/0123555 A1 * | 5/2008 | Qi et al. .......................... 370/254 |
| 2009/0204811 A1 * | 8/2009 | Fries et al. ..................... 713/160 |
| 2009/0310726 A1 * | 12/2009 | Alankry et al. ............... 375/359 |
| 2010/0100759 A1 * | 4/2010 | Blixt et al. .................... 713/502 |
| 2010/0153742 A1 * | 6/2010 | Kuo et al. ..................... 713/189 |

FOREIGN PATENT DOCUMENTS

| DE | 102005025328 | 12/2006 |
| EP | 1104962 | 6/2001 |
| EP | 1953937 | 8/2008 |
| WO | WO 2006128748 A1 * | 12/2006 |

OTHER PUBLICATIONS

Dopplinger "Using IEEE 1588 for synchronization for network-connected devices", Mar. 2007.*
IEEE Std. 1588-2008 A precision clock synchronization protocol for networked measurement and control systems), Rev.1588-2002.*
"Precision Time Protocol" Wikipedia Aug. 16, 2008, XP-002600669 Retrieved from the Internet:URL:http://en.wikipedia.org/w/index.php?title=Precision_Time_Protocol&oldid=232315414 &printable=yes [retrieved on Sep. 14, 2010]; 4 pages.
Dopplinger A. et al: "Using IEEE 1588 for synchronization of network-connected devices" Mar. 29, 2007, XP-002600668 Retrieved from the Internet: URL:http://www.eetimes.com/design/industrial-control/4007059/Using-IEEE-1588-for-synchronization-of-network-connected-devices [on Sep. 14, 2010], 7 pages.

(Continued)

*Primary Examiner* — Kaveh Abrishamkar
*Assistant Examiner* — Shan Elahi

(57) ABSTRACT

A system includes a medium access control (MAC) module and a precise time protocol (PTP) module. The MAC module is configured to generate an identifier for a PTP frame, generate an encrypted PTP frame by encrypting the PTP frame, and output the identifier. The PTP module is configured to receive the identifier, identify the encrypted PTP frame based on the identifier in response to the encrypted PTP frame being output from the MAC module, and time stamp the encrypted PTP frame prior to the encrypted PTP frame being transmitted.

15 Claims, 8 Drawing Sheets

OTHER PUBLICATIONS

IEC 61588: "IEEE 1588: Precision clock synchronization protocol for networked measurement and control systems" International Standard—IEC 61588(E):2004, Sep. 1, 2004, XP-002367391; 151 pages.

IEEE St 802.1 AE-2006,"Media Access Control (MAC) Security"; IEEE Computer Society; http://standards.ieee.org; Jun. 18, 2006; 152 pages.

Notification of Transmittal of The International Search Report and The Written Opinion of The International Searching Authority, or the Declaration dated Sep. 29, 2010 for application PCT/US2009/054625; 14 pages.

IEEE P1588TM D2.2; Draft Standard for a Precision Clock Synchronization Protocol for Networked Measurement and Control Systems; 2008; 299 pages.

IEEE Std. 802.1AETM—2006; IEEE Standard for Local and metropolitan area networks; Media Access Control (MAC) Security; IEEE Computer Society; Sponsored by the LAN/MAN Standards Committee; Aug. 18, 2006; 154 pages.

Summary of "Notice of Reasons for Rejection;" RYUKA IP Law Firm; Jun. 26, 2012; Pat. App. No. 2011-524029; 2 pages.

* cited by examiner

METHOD AND APPARATUS FOR INTEGRATING PRECISE TIME PROTOCOL AND MEDIA ACCESS CONTROL SECURITY IN NETWORK ELEMENTS

CROSS-REFERENCE TO RELATED APPLICATIONS

This application claims the benefit of U.S. Provisional Application No. 61/091,214, filed on Aug. 22, 2008. The disclosure of the above application is incorporated herein by reference in its entirety.

FIELD

The present disclosure relates to network devices and more particularly to integrating precise time protocol (PTP) and media access control (MAC) security function (MACsec) in network devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, a network device 100 comprises a physical layer (PHY) module 102, a medium access control (MAC) module 104, and a processor 106. The network device 100 may communicate with other network devices in a network (not shown) via a communication medium 108. The network may include an Ethernet network. The communication medium may include wireline or wireless medium.

The PHY module 102 interfaces the network device 100 to the communication medium 108. The PHY module 102 transmits and receives data via the communication medium 108. The MAC module 104 controls access to the communication medium 108. The MAC module 104 performs various functions. The functions may include encrypting data to be transmitted from the network device 100 and decrypting data received by the network device 100.

The processor 106 processes the data to be transmitted and the data received. The processor 106 may execute applications including multimedia applications. The types of applications may depend on the capabilities of the network device 100 and the operations performed by the network device 100.

SUMMARY

A system comprises a medium access control (MAC) module and a precise time protocol (PTP) module. The MAC module is configured to generate an identifier for a PTP frame, generate an encrypted PTP frame by encrypting the PTP frame, and output the identifier. The PTP module is configured to receive the identifier, identify the encrypted PTP frame based on the identifier in response to the encrypted PTP frame being output from the MAC module, and time stamp the encrypted PTP frame prior to the encrypted PTP frame being transmitted.

In other features, a system comprises a precise time protocol (PTP) module and a medium access control (MAC) module. The PTP module is configured to generate a receive time stamp and an identifier in response to an encrypted frame being received via a communication medium. The PTP module is further configured to store the receive time stamp and the identifier and output the encrypted frame and the identifier. The MAC module is configured to generate a decrypted frame by decrypting the encrypted frame and output the identifier when the decrypted frame is a PTP frame. The PTP module retrieves the receive time stamp corresponding to the identifier received from the MAC module and adds the receive time stamp to the decrypted frame.

In still other features, a physical layer device (PHY) comprises a parsing module and a time stamp module. The parsing module is configured to parse a header of a frame received via a communication medium and determine whether the frame is a precise time protocol (PTP) frame, wherein the frame is unencrypted. The time stamp module configured to time stamp the frame with a receive time stamp in response to the frame being the PTP frame.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
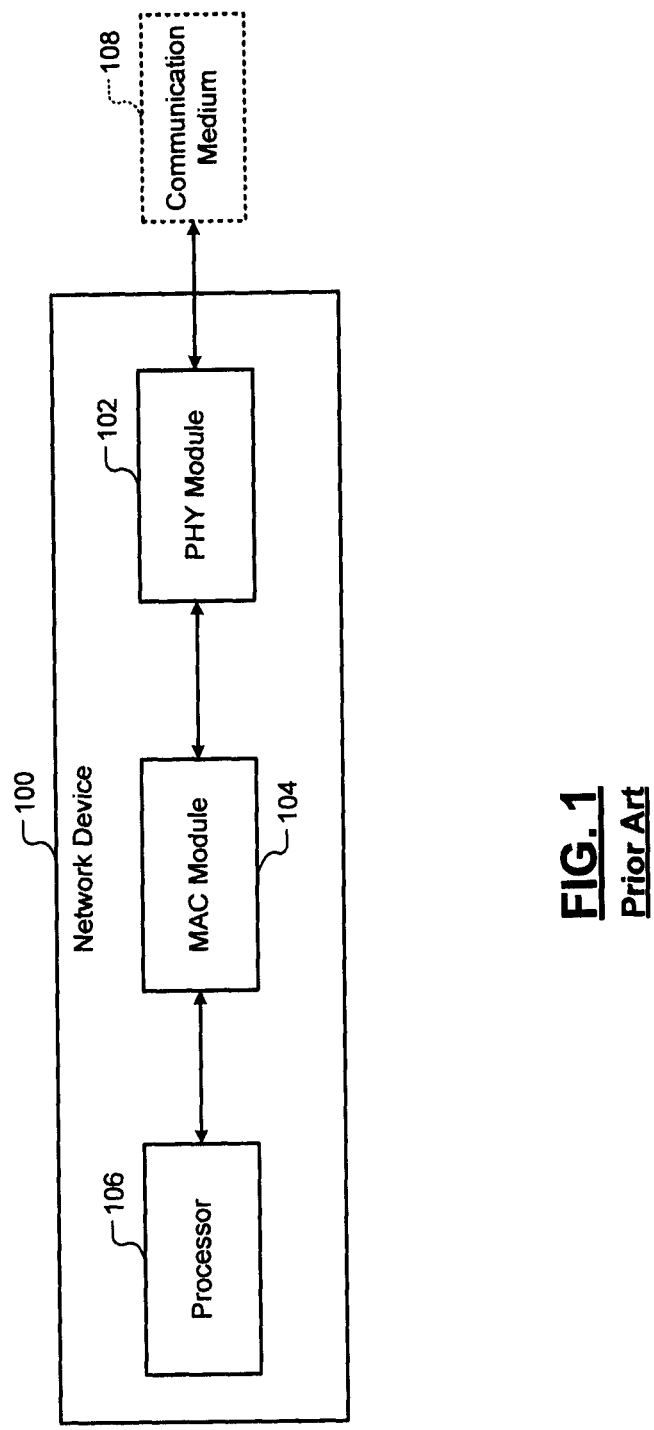
FIG. 1 is a functional block diagram of a network device.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Network devices may exchange timing information that includes time-of-the-day data that is used to synchronize the time-of-the-day information on the network devices. Additionally, network devices may utilize the timing information to synchronize internal clock signals that are used to process data.

Network devices can exchange timing information using a precise time protocol (PTP). For example only, the network devices may use the PTP disclosed in the IEEE 1588 standard, which is incorporated herein by reference in its entirety. Specifically, network devices can exchange timing information via frames of data that are designated as PTP frames.

Additionally, network devices can securely exchange data using a medium access control (MAC) security (MACsec) protocol. For example only, network devices may use the MACsec protocol disclosed in the IEEE 802.1AE standard, which is incorporated herein by reference in its entirety.

Using the MACsec protocol, a transmitting network device typically encrypts frames before transmission, and a receiving network device decrypts the frames upon receipt. The transmitting and receiving network devices may exchange security keys, authentication information, etc. that are used to encrypt and decrypt the frames.

Figure 2B:
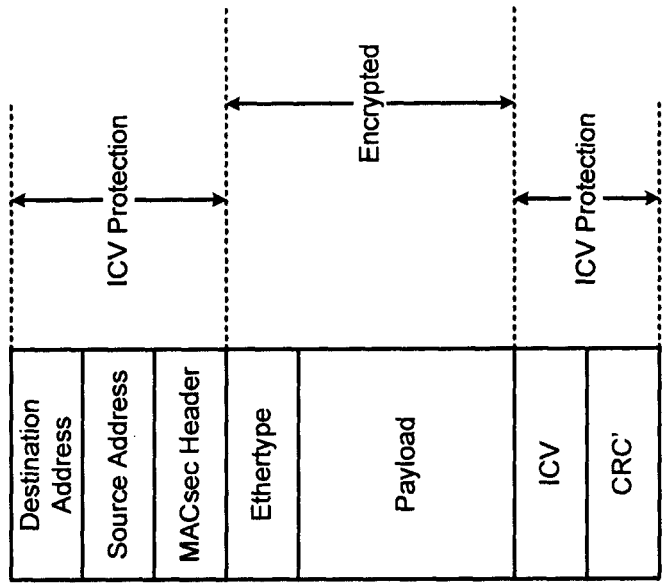
FIG. 2B depicts an encrypted frame of data.
Figure 2A:
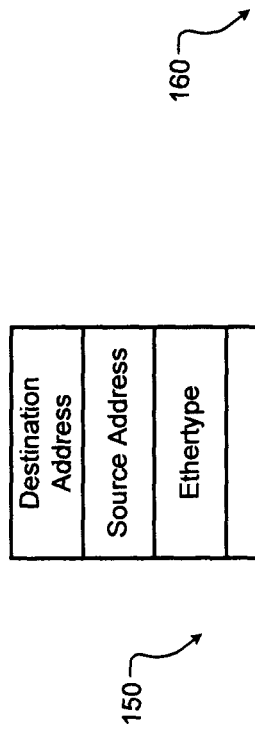
FIG. 2A depicts an unencrypted frame of data.

Referring now to FIGS. 2A and 2B, examples of a plaintext (unencrypted) frame 150 and an encrypted frame 160 are shown. The encrypted frame 160 can correspond to an encrypted version of the unencrypted frame 150. In FIG. 2A, for example only, the unencrypted frame 150 comprises the following fields: a destination address, a source address, an Ethertype field, a payload, and a cyclic redundancy check (CRC) field. The Ethertype field indicates a type of frame. For example, the Ethertype field can indicate that the unencrypted frame 150 is a PTP frame. The payload in a PTP frame includes PTP data (e.g., timing information).

In FIG. 2B, the encrypted frame 160 comprises the following fields: the destination address, the source address, a MACsec header, the Ethertype field, the payload, an integrity check value (ICV) field, and the CRC field. The MACsec protocol adds the MACsec header. The MACsec header is unencrypted. The Ethertype field and the payload are encrypted before transmission.

Figure 3:
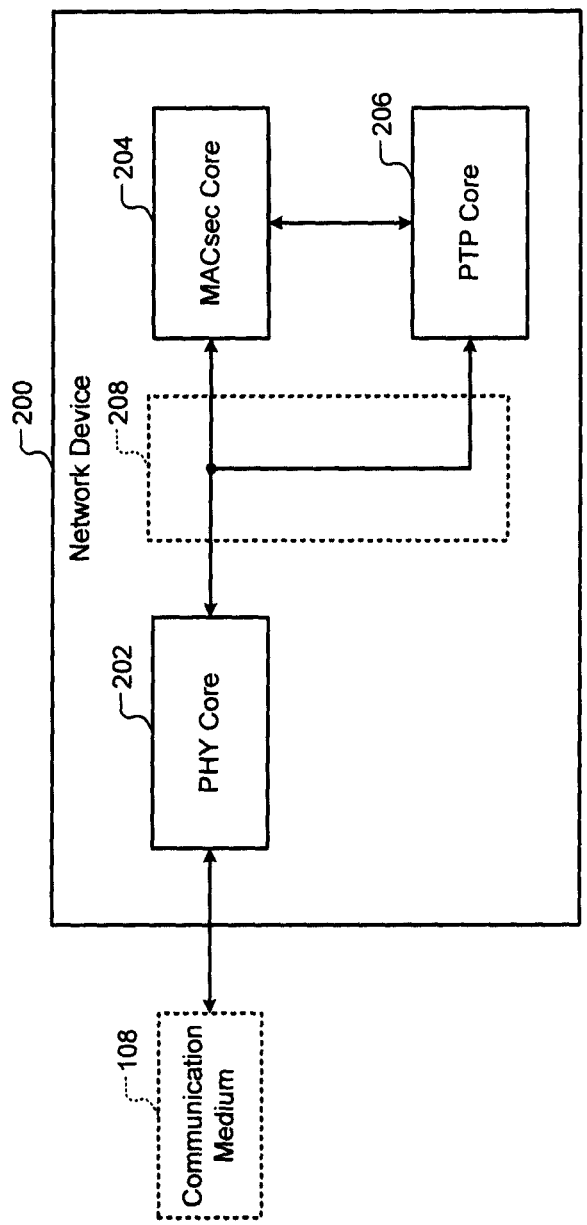
FIG. 3 is a functional block diagram of a network device that implements a precise time protocol (PTP) and a medium access control (MAC) security (MACsec) protocol.

Referring now to FIG. 3, a network device 200 comprises a physical layer (PHY) core 202, a MACsec core 204, and a PTP core 206. The PHY core 202 and the MACsec core 204 can be implemented by a PHY module and a MAC module, respectively. The PTP core 206 can be implemented by a PTP module. Alternatively, the PTP core 206 or portions thereof can be implemented by the PHY module and/or the MAC module.

The PHY core 202 interfaces the network device 200 to the communication medium 108. The PHY core 202 transmits and receives frames of data via the communication medium 108. The MACsec core 204 can implement the MACsec protocol. The MACsec core 204 encrypts frames to be transmitted and decrypts frames received. The PTP core 206 can implement the PTP protocol. The PTP core 206 time stamps frames when the frames are transmitted and received.

The MACsec core 204 and the PTP core 206 can interface with the PHY core 202 via a media-independent interface (MII) bus 208. For example only, the MII bus 208 can include a gigabit MII (GMII) bus or a 10 GB XGMII bus. During transmission, the PTP core 206 detects when the PHY core 202 receives frames from the MACsec core 204 via the MII bus 208. During reception, the PTP core 206 detects when the PHY core 202 receives frames from the communication medium 108 and outputs the frame to the MACsec core 204 via the MII bus 208. Thus, the PTP core 206 can time stamp the frames to be transmitted and frames received.

A program executed by a processor (not shown) of the network device 200 can generate time-of-the-day data based on the time stamps included in the PTP frames received. For example, when a transmitting device transmits a PTP frame, a PTP core of the transmitting device time stamps the PTP frame with a transmit time. The transmit time can indicate an approximate time at which the PTP frame was transmitted. When a receiving device receives the PTP frame, a PTP core of the receiving device time stamps the PTP frame with a receive time. The receive time can indicate an approximate time at which the PTP frame is received. A program executed at the receiving device can generate the time-of-the-day data for the receiving device based on the transmit and receive times included in the PTP frame.

To accurately generate the time-of-the-day data, the PTP core 206 should time stamp the PTP frames immediately before transmitting and immediately after receiving the PTP frames. In other words, the PTP core 206 should time stamp the PTP frames as close to the communication medium 108 as possible. When encryption is used, however, the PTP core 206 cannot know which frames are PTP frames immediately before transmitting and immediately after receiving the encrypted frames. The PTP core 206 cannot identify the PTP frames because the Ethertype field, which indicates whether a frame is a PTP frame, is encrypted. Accordingly, the PTP core 206 cannot time stamp the PTP frames immediately before transmitting and immediately after receiving encrypted frames.

More specifically, during reception, when an encrypted frame is received, the MACsec core 204 first decrypts the encrypted frame. The MACsec core 204 then parses (decodes) the Ethertype header from the decrypted frame to determine whether the received frame is a PTP frame. Only then the PTP core 206 can time stamp the received frame. The decrypting and parsing, however, delays the time stamping. The delay in time stamping may cause inaccuracies in the time-of-the-day data.

Conversely, during transmission, the PTP core 206 first time stamps a PTP frame. The MACsec core 204 may then encrypt the PTP frame. Additionally, the MACsec core 204 may store encrypted frames in a transmit buffer. Depending on the size of the transmit buffer, the encrypted frames may be stored in the transmit buffer for an extended period of time before transmission. Consequently, the time-of-the-day data that is generated when the frames are received may be inaccurate due to the delay caused by the extended storage of the frames in the transmit buffer.

One solution to this problem can include sending the PTP information unencrypted and sending the remaining information encrypted. Security may be compromised, however, when the PTP information is unencrypted. Accordingly, this solution may not be desirable.

The present disclosure relates to systems and methods that allow MACsec and PTP cores of a network device to exchange information during transmission and reception of frames. The information exchange allows time stamping of encrypted frames during transmission and reception such that the time stamps closely correspond to actual times of transmission and reception of the frames. Accordingly, the time-of-the-day data can be accurately generated based on the times stamps.

Figure 4:
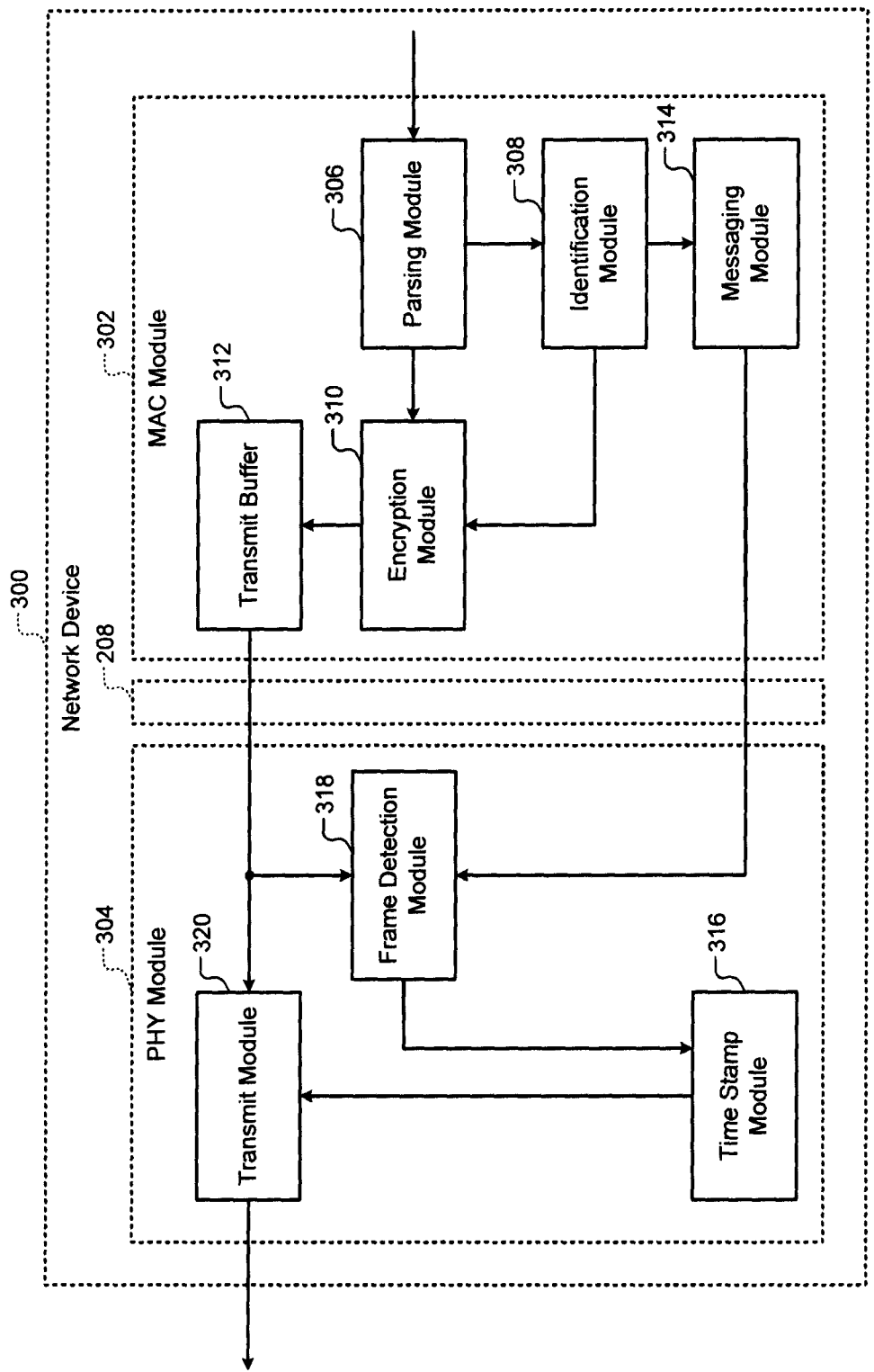
FIG. 4 is a functional block diagram of a transmit portion of a network device that implements the PTP and the MACsec protocol.

Referring now to FIG. 4, a transmit portion of a network device 300 according to the present disclosure is shown. The network device 300 comprises a MAC module 302 and a PHY module 304. The MAC module 302 and the PHY module 304 communicate via the MII bus 208 and implement the MACsec protocol and the PTP protocol, respectively.

The MAC module 302 comprises a parsing module 306, an identification module 308, an encryption module 310, a transmit buffer 312, and a messaging module 314. The PHY module 304 comprises a time stamp module 316, a frame detection module 318, and a transmit module 320.

The parsing module 306 receives a frame to be transmitted. The parsing module 306 parses (decodes) the Ethertype header of the frame and determines whether the frame is a PTP frame.

When the frame is not a PTP frame, the parsing module 306 outputs the frame to the encryption module 310. The encryption module 310 encrypts the frame and stores the encrypted frame in the transmit buffer 312. The transmit buffer 312 outputs the encrypted frame to the transmit module 320. The transmit module 320 transmits the encrypted frame.

When the frame is a PTP frame, the parsing module 306 generates a control signal indicating that the frame to be transmitted is a PTP frame. The parsing module 306 outputs the frame (i.e., the PTP frame) to the encryption module 310. The identification module 308 generates an identifier for the PTP frame when the control signal is received. The identification module 308 outputs the identifier to the encryption module 310 and the messaging module 314.

The encryption module 310 encrypts the frame and stores the encrypted frame along with the identifier in the transmit buffer 312. The messaging module 314 receives the identifier from the identification module 308 and generates a message comprising the identifier. The frame detection module 318 receives the message.

The transmit buffer 312 outputs encrypted frames to the transmit module 320 via the MII bus 208. The frame detection module 318 uses the identifier in the message received from the messaging module 314. Using the identifier, the frame detection module 318 detects which of the encrypted frames output by the transmit buffer 312 is a PTP frame. The frame detection module 318 outputs a control signal to the time stamp module 316 when an encrypted frame output by the transmit buffer is a PTP frame.

The time stamp module 316 time stamps the encrypted frame identified as a PTP frame. The time stamp module 316 can time stamp the PTP frame when the transmit module 320 transmits the encrypted frame. The transmit module 320 transmits the time stamped PTP frame. Thus, a PTP frame can be transmitted with encryption and can be time stamped immediately before transmission (i.e., just before transmission).

Figure 5:
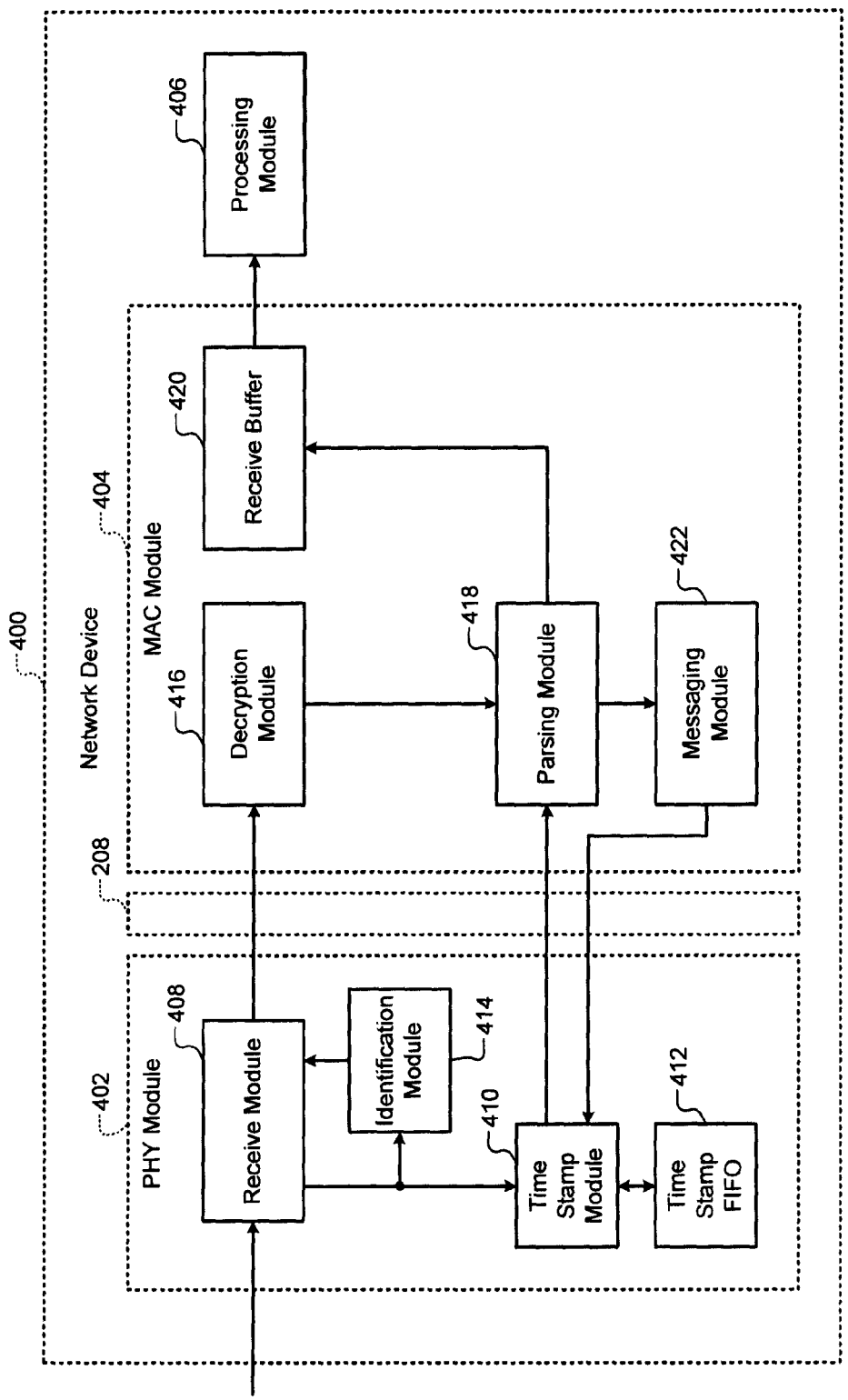
FIG. 5 is a functional block diagram of a receive portion of a network device that implements the PTP and the MACsec protocol.

Referring now to FIG. 5, a receive portion of a network device 400 according to the present disclosure is shown. The network device 400 comprises a PHY module 402, a MAC module 404, and a processing module 406. The PHY module 402 and the MAC module 404 communicate via the MII bus 208 and implement the PTP protocol and the MACsec protocol, respectively.

The PHY module 402 comprises a receive module 408, a time stamp module 410, a time stamp FIFO 412, and an identification module 414. The MAC module 404 comprises a decryption module 416, a parsing module 418, a receive buffer 420, and a messaging module 422.

The receive module 408 receives encrypted frames and generates control signals when each encrypted frame is received. The time stamp module 410 generates a time stamp when each encrypted frame is received and stores the time stamp in the time stamp FIFO 412. The time stamp module 410 can generate the time stamps based on the control signals received from the receive module 408.

The identification module 414 generates an identifier for each encrypted frame received and outputs the identifier to the receive module 408. The identification module 414 generates identifiers based on the control signals received from the receive module 408. The time stamp module 410 stores the identifier along with the time stamp in the time stamp FIFO 412 for each encrypted frame received.

The receive module 408 associates the identifier with the encrypted frame received. The receive module 408 outputs the encrypted frame and the identifier to the decryption module 416. The decryption module 416 decrypts the encrypted frame received and outputs the decrypted frame along with the identifier to the parsing module 418. The parsing module 418 parses (decodes) the Ethertype header of the decrypted frame and determines whether the decrypted frame is a PTP frame.

When the decrypted frame is not a PTP frame, the parsing module 418 outputs the decrypted frame to the receive buffer 420. The receive buffer 420 stores the decrypted frame and outputs the decrypted frame to the processing module 406 for processing.

When the decrypted frame is a PTP frame, the parsing module 418 generates a control signal indicating that the encrypted frame received is a PTP frame. The control signal includes the identifier of the PTP frame. The messaging module 422 receives the identifier for the PTP frame via the control signal. The messaging module 422 generates a message comprising the identifier. The time stamp module 410 receives the message.

The time stamp module 410 uses the identifier in the message to locate a time stamp stored in the time stamp FIFO 412. The time stamp module 410 locates the time stamp that was generated when the encrypted frame corresponding to the PTP frame was received. The time stamp module 410 outputs the time stamp to the parsing module 418. The parsing module 418 adds the time stamp to the PTP frame and outputs a time stamped PTP frame to the receive buffer 420.

Thus, a PTP frame can be received with encryption and can be time stamped such that the time stamp reflects the actual time at which the PTP frame was received into the receive module 408. The receive buffer 420 outputs the time stamped PTP frame to the processing module 406. The processing module 406 executes a program that processes the time stamped PTP frame. The processing module 406 generates accurate time-of-the-day data for the network device 400 based on the transmit and receive time stamps included in the PTP frame.

In some implementations, encryption (i.e., the MACsec protocol) can be selectively turned off. Accordingly, portions of the MAC modules 302, 404 and the PHY modules 304, 402 can be selectively powered down until encryption is turned on again. For example, the encryption module 310 and the decryption module 416 can be powered down. Further, the PHY modules 304, 402 can be dynamically reconfigured.

For example, the PHY module 304 can comprise a parsing module that parses unencrypted frames to be transmitted and that determines whether an unencrypted frame is a PTP frame. When the unencrypted frame is a PTP frame, the time stamp module 316 time stamps the unencrypted frame immediately before transmission. The frame detection module 318 may be unnecessary and may be powered down until encryption is turned on.

Additionally, the PHY module 402 can comprise a parsing module that parses unencrypted frames received and that determines whether an unencrypted frame received is a PTP frame. When the unencrypted frame received is a PTP frame, the time stamp module 410 time stamps the unencrypted frame immediately upon receipt. The time stamp FIFO 412 can be reduced in size since storing time stamps for each frame received may be unnecessary until encryption is turned on. Further, the identification module 414 may be unnecessary and may be powered down until encryption is turned on.

Thus, a parsing module can be configured in the PHY modules 304, 402 to facilitate dynamically turning encryption on or off. The MAC modules 302, 404 (hereinafter the MAC modules) can dynamically turn encryption on or off. The MAC modules can power down selected modules in the PHY and MAC modules of the network devices 300, 400 when the selected modules are not used while encryption is turned off. The MAC modules can power up the selected modules when encryption is turned on again.

The MAC modules can power down the parsing module that is included in the PHY modules 304, 402 to parse unencrypted frames when encryption is turned on. The MAC modules can reduce the size of the time stamp FIFO 412 when encryption is turned off and may restore the size when encryption is turned on. In some implementations, a power management module (not shown) of the network devices 300, 400 can perform the power up and power down operations.

Figure 6:
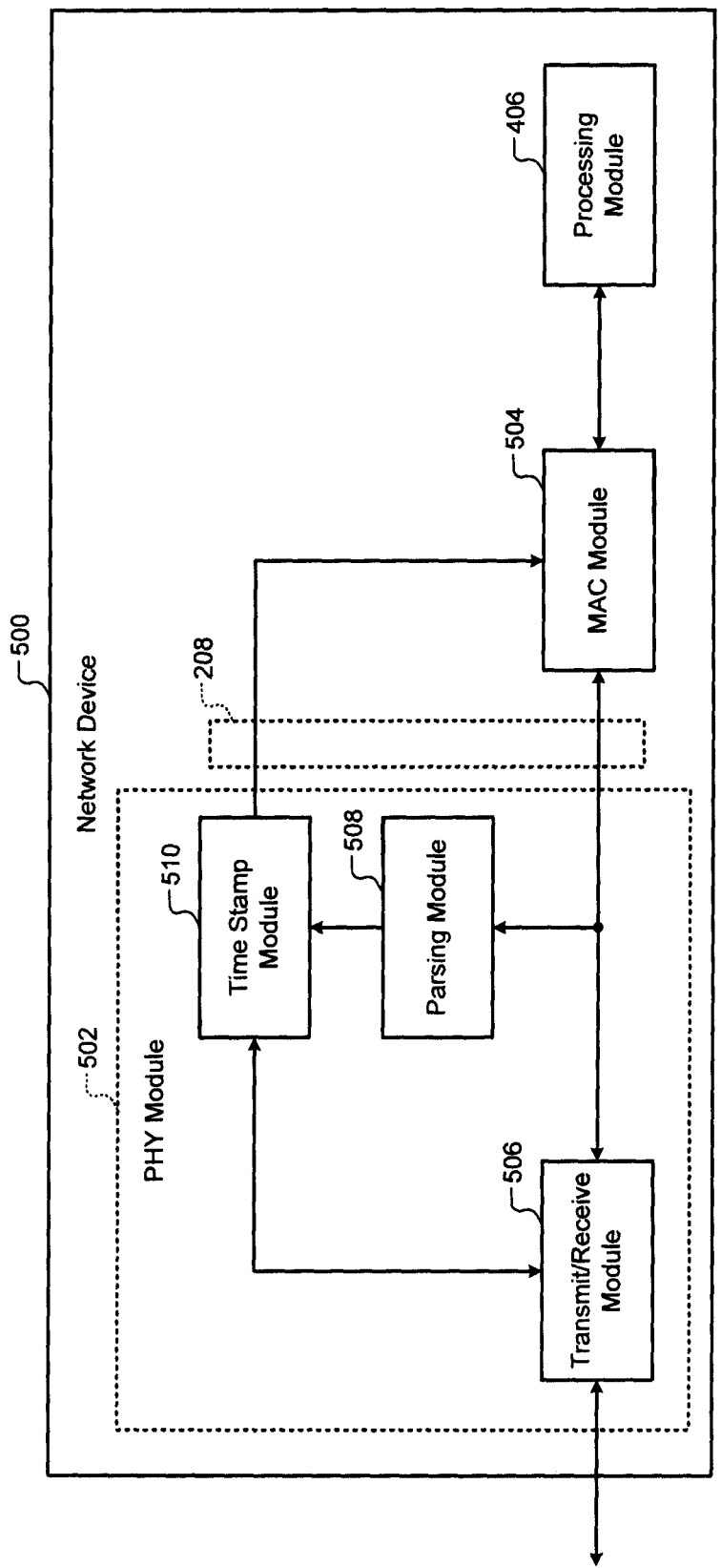
FIG. 6 is a functional block diagram of a network device that implements PTP and that selectively implements the MACsec protocol.

Referring now to FIG. 6, a network device 500 comprises a PHY module 502, a MAC module 504, and the processing module 406. The PHY module 502 and the MAC module 504 communicate via the MII bus 208. The PHY module 502 implements the PTP protocol and comprises a transmit/receive module 506, a parsing module 508, and a time stamp module 510. The transmit/receive module 506 can include a transceiver module. The MAC module 504 can implement the MACsec protocol and can selectively turn the MACsec protocol on or off. The MAC module 504 can turn encryption on or off and can perform the power up and power down operations described above.

When encryption is turned off, during transmission, the MAC module 504 outputs unencrypted frames to the PHY module 502 via the MII bus 208. The parsing module 508 parses the Ethertype header of each unencrypted frame and determines whether an unencrypted frame is a PTP frame. When the unencrypted frame is a PTP frame, the time stamp module 510 time stamps the unencrypted frame immediately before transmission. The transmit/receive module 506 transmits the time stamped PTP frame.

Additionally, when the transmit/receive module 506 receives unencrypted frames, the parsing module 508 parses the Ethertype header of each unencrypted frame received. The parsing module 508 determines whether an unencrypted frame received is a PTP frame. When the unencrypted frame received is a PTP frame, the time stamp module 510 time stamps the unencrypted frame immediately upon receipt. The time stamped PTP frame is then forwarded to the MAC module 504 and/or the processing module 406 for processing. The processing module 406 generates time-of-the-day data for the network device 500 based on the transmit and receive time stamps included in the PTP frame.

The systems described in the present disclosure can be integrated into a system-on-chip. Additionally, some of the modules included in the PHY modules can instead be included in the MAC modules and vice versa. Further, a plurality of modules in the PHY modules and/or the MAC modules can be combined into a single module.

Figure 7:
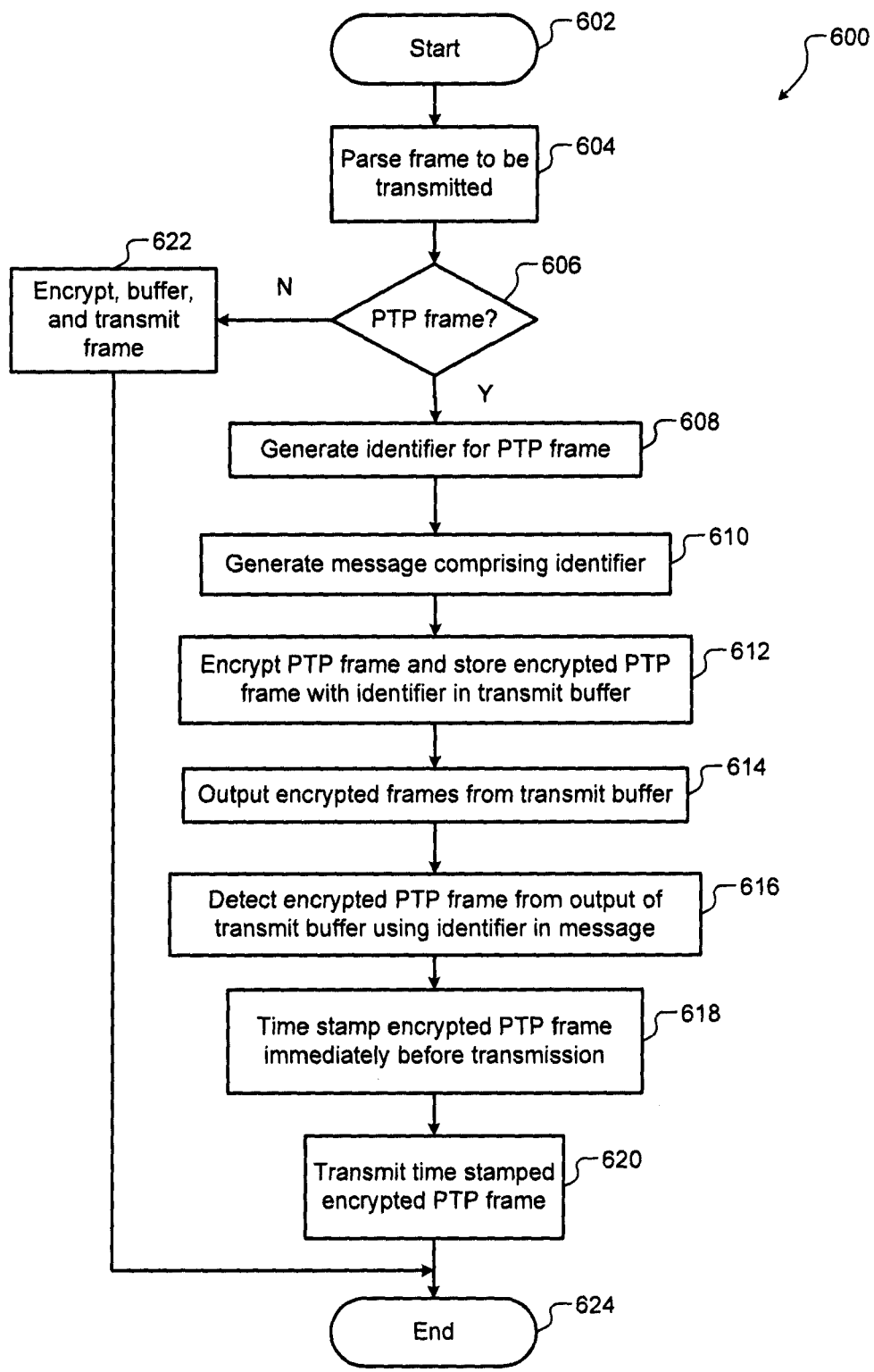
FIG. 7 is a flowchart of a method for transmitting encrypted PTP frames.

Referring now to FIG. 7, a method 600 for transmitting encrypted PTP frames according to the present disclosure is shown. Control begins in step 602. In step 604, control parses a frame to be transmitted. Control determines in step 606 whether the frame is a PTP frame.

When the result of step 606 is true, control generates an identifier for the PTP frame in step 608. Control generates a message comprising the identifier in step 610. In step 612, control encrypts the PTP frame and stores the encrypted PTP frame along with the identifier in a transmit buffer. Control outputs encrypted frames from the transmit buffer in step 614.

In step 616, control uses the identifier from the message and detects the encrypted PTP frame from the output of the transmit buffer. In step 618, control time stamps the encrypted PTP frame immediately before transmission. Control transmits the time stamped and encrypted PTP frame in step 620. When the result of step 606 is not true, control encrypts, stores, and transmits the frame in step 622. At the end of step 620 or 622, control ends in step 624.

Figure 8:
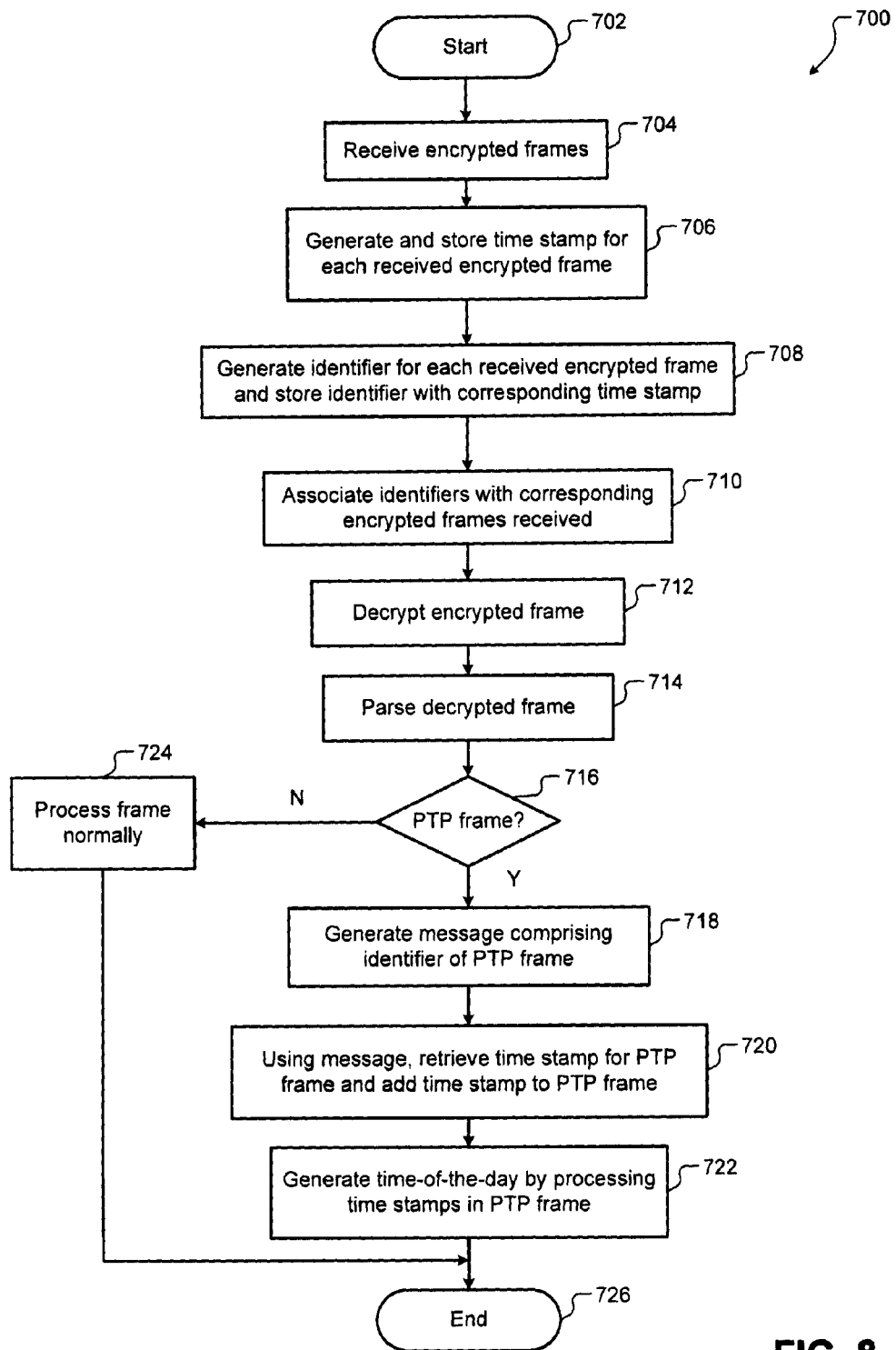
FIG. 8 is a flowchart of a method for receiving encrypted PTP frames and generating time-of-the-day data.

Referring now to FIG. 8, a method 700 for receiving encrypted PTP frames according to the present disclosure is shown. Control begins in step 702. Control receives encrypted frames in step 704. In step 706, control generates and stores a time stamp for each encrypted frame received. In step 708, control generates an identifier for each encrypted frame received and stores the identifier with a corresponding time stamp of the encrypted frame.

In step 710, control associates identifiers with corresponding encrypted frames received. Control decrypts a received encrypted frame in step 712. Control parses the decrypted frame in step 714. Control determines in step 716 whether the decrypted frame is a PTP frame.

When the result of step 716 is true, control generates a message comprising the identifier of the decrypted frame (i.e., the PTP frame) in step 718. In step 720, using the identifier, control locates the time stamp that was stored when the encrypted frame corresponding to the PTP frame was received and adds the time stamp to the PTP frame.

In step 722, control processes the time stamps included in the PTP frame when the PTP frame was transmitted and received and generates time-of-the-day data. When the result of step 716 is false, control processes the decrypted frame normally in step 724. At the end of step 722 or 724, control ends in step 726.

Encrypted frames are used throughout the present disclosure for example only. The teachings of the present disclosure, however, may be applicable to unencrypted frames as well.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
   a medium access control (MAC) module configured to
      generate an identifier for a precise time protocol (PTP) frame;
      generate an encrypted PTP frame by encrypting the PTP frame; and
      output the identifier; and
   a PTP module configured to
      receive the identifier;
      in response to the encrypted PTP frame being output from the MAC module, identify the encrypted PTP frame based on the identifier; and
      time stamp the encrypted PTP frame identified based on the identifier prior to transmitting the encrypted PTP frame identified based on the identifier.

2. The system of claim 1, wherein the MAC module comprises a parsing module configured to:
   parse a header of a frame prior to encrypting the frame; and
   determine whether the frame is the PTP frame.

3. The system of claim 1, wherein the MAC module stores the encrypted PTP frame and the identifier prior to the encrypted PTP frame being transmitted.

4. The system of claim 1, wherein the PTP module comprises a frame detection module configured to:
receive the identifier from the MAC module prior to the MAC module outputting the encrypted PTP frame;
monitor frames output from the MAC module; and
detect the encrypted PTP frame from the frames based on the identifier when the encrypted PTP frame and the identifier are output from the MAC module.

5. The system of claim 4, wherein the PTP module further comprises a time stamp module configured to time stamp the encrypted PTP frame detected by the frame detection module.

6. The system of claim 1, further comprising a PHY module configured to transmit the encrypted PTP frame over a network via a communication medium after the encrypted PTP frame is time stamped.

7. A network device comprising the system of claim 1.

8. A system comprising:
a precise time protocol (PTP) module configured to
generate (i) a receive time stamp in response to receiving an encrypted frame via a communication medium, and (ii) an identifier used to identify the encrypted frame received via the communication medium;
store (i) the receive time stamp, and (ii) the identifier associated with the encrypted frame; and
output (i) the encrypted frame, and (ii) the identifier associated with the encrypted frame; and
a medium access control (MAC) module configured to
generate a decrypted frame by decrypting the encrypted frame identified using the identifier; and
output (i) the decrypted frame, and (ii) the identifier used to identify the encrypted frame,
wherein, when the decrypted frame is a PTP frame, the PTP module is configured to
retrieve the receive time stamp associated with the encrypted frame identified using the identifier, and
add the receive time stamp associated with the encrypted frame identified using the identifier to the decrypted frame generated by decrypting the encrypted frame identified using the identifier.

9. The system of claim 8, wherein the MAC module comprises a parsing module configured to:
parse a header of the decrypted frame; and
determine whether the decrypted frame is the PTP frame.

10. The system of claim 8, wherein the encrypted frame includes a transmit time stamp configured to indicate when the encrypted frame was transmitted via the communication medium by a device remote from the system.

11. The system of claim 10, further comprising a processing module configured to:
process the decrypted frame; and
generate a time-of-the-day data based on the receive time stamp and the transmit time stamp.

12. A network device comprising:
the system of claim 8; and
a processing module configured to:
process the decrypted frame; and
generate a time-of-the-day data for the network device based on the receive time stamp and a transmit time stamp included in the decrypted frame,
wherein the transmit time stamp indicates when the encrypted frame was transmitted via the communication medium by a device remote from the network device.

13. A physical layer device (PHY) comprising:
a parsing module configured to
parse a header of a frame received via a communication medium, herein the frame received via the communication medium is unencrypted; and
determine, based on parsing the header of the urencrypted frame, whether the unencrypted frame is a precise time protocol (PTP) frame; and
a time stamp module configured to time stamp the unencrypted frame with a receive time stamp in response to determining based on the parsing that the unencrypted frame is a PTP frame.

14. The PHY of claim 13, wherein the unencrypted frame includes a transmit time stamp, the transmit time stamp indicating when the unencrypted frame was transmitted via the communication medium by a device remote from the PHY.

15. A network device comprising:
the PHY of claim 14; and
a processing module configured to:
process the PTP frame; and
generate a time-of-the-day data for the network device based on the receive time stamp and the transmit time stamp.

* * * * *